United States Patent [19]

Torre-Bueno

[11] Patent Number: 5,087,965
[45] Date of Patent: Feb. 11, 1992

[54] RECOGNITION OF IMAGE COLORS USING ARBITRARY SHAPES IN COLOR SPACE

[75] Inventor: Jose R. Torre-Bueno, San Diego, Calif.

[73] Assignee: American Innovision, Inc., San Diego, Calif.

[21] Appl. No.: 373,321

[22] Filed: Jun. 28, 1989

[51] Int. Cl.⁵ .............................................. H04N 9/68
[52] U.S. Cl. ...................................... 358/22; 358/27; 358/80
[58] Field of Search .................. 358/22 C, 27, 28, 29, 358/78, 80, 22

[56] References Cited

U.S. PATENT DOCUMENTS

| | | | |
|---|---|---|---|
| 4,430,748 | 2/1984 | Tuhro et al. | 382/50 |
| 4,797,738 | 1/1989 | Kashi et al. | 358/101 |
| 4,954,881 | 9/1990 | Kaye | 358/27 |
| 4,991,223 | 2/1991 | Bradley | 358/22 |

Primary Examiner—Tommy P. Chin
Attorney, Agent, or Firm—Baker, Maxham, Jester & Meador

[57] ABSTRACT

In a color identification system in which a video signal is rendered into three mutually distinct color element signals, a set of defined colors is established. The disclosed invention defines each color in the set by three compound color components, each compound color component being defined by pairwise combination of color element magnitude ranges. As the color element signals change at the pixel rate of the video signal, the invention combines them into three compound signals, each compound signal resulting from combination of a respective two of the color signals. Each of these pairwise combinations is compared with compound color component sets to determine whether the current pixel embodies a color in the set of defined colors.

12 Claims, 3 Drawing Sheets

RECOGNITION OF IMAGE COLORS USING ARBITRARY SHAPES IN COLOR SPACE

BACKGROUND OF THE INVENTION

The invention is in the field of video image color processing, and is particularly relevant to identification of colors in a video image signal.

In the field of video image processing, an image is scanned and rendered into a string of individual picture elements (pixels), each corresponding to an elemental portion of the image and representing the instantaneous value of optical characteristics of the portion of the image embodied in the pixel. In monochromatic television, light intensity is the attribute represented by a pixel. In digitized black and white television, a pixel is a multi-bit digital representation of light intensity. Pixels are presented serially in a standard scan format composed of lines, fields, and frames to represent an image.

A pixel in a color imaging system represents light intensity and other chromaticity characteristics which, when combined with intensity, represent the color of the portion of the image embodied in the pixel. Scanned color imaging systems correspond with monochromatic systems in that repeated concatenations of pixels represent a scanned image. Two well-known scanned color image representations are the NTSC and RGB forms.

Typical scanned color image systems are based upon one or more representations of color space. Here, color space refers to any one of a number of three-dimensional representations of all of the possible combinations of three predetermined color attributes. For example, a set of color elements can include hue, saturation, and intensity.

In U.S. Pat. No. 4,991,223 "APPARATUS AND METHOD FOR RECOGNIZING IMAGE FEATURES USING COLOR ELEMENTS", and commonly assigned with this application, a system is presented for recognition of objects in a scanned color image based upon classification of a color video signal by comparison with a set of defined colors. This patent is incorporated herein by reference.

The method and apparatus of the incorporated patent is based upon the concept of color as a location in three-dimensional space defined by color axes, and the optional concept of transforming the axes in color space to yield one axis corresponding to brightness (intensity) and two other axes representing non-intensity color elements. The system of the incorporated application can be understood with reference to FIG. 1 which shows a cube 10 representing color space, the color space being defined by three mutually orthogonal axes, 12, 14, and 16. Each orthogonal axis corresponds to a color element. The color elements can be, for example, the R-Y, B-Y, and Y channels of a color video system. The cube 10 represents all colors which the color processing system of this invention can process. In the operation of the system in the incorporated patent application, a set of colors to be identified in a video image is defined. Each defined color is established by three separate thresholds for the three channels of video color. A video color is accepted by the system of the incorporated patent as a defined color if it is within all three thresholds as determined by the system. In this regard, three thresholds in FIG. 1 are indicated by th.1, th.2, and th.3. Each of the thresholds represents a range of color element magnitudes on one of the respective axes 12, 14, or 16. The three thresholds define mutually perpendicular slabs in color space whose intersection is mapped by the rectangular space 20. The rectangular space essentially establishes the defined color which is achieved by combining the three color elements in the magnitude ranges represented by the three thresholds of FIG. 1.

The system of the incorporated patent operates effectively to discriminate between colors contained in non-intersecting rectangular solids of color space. However, there is a need to discriminate colors which might lie within a rectangular region formed by the intersection of two rectangular solids. In particular, two partially shadowed objects whose hue and brightness are the same and which differ only in saturation appear as two ovoids in color space which lie one on top of the other. This is illustrated in FIG. 2 by the ovoid solids 22 and 24. Inspection of FIG. 2 will reveal that the rectangular approach based upon the thresholds of FIG. 1 cannot establish a set of three thresholds for definition of the colors in the ovoid 22 which will always distinguish colors in a solid defined by three other thresholds which contains the colors of the ovoid 24.

SUMMARY OF THE INVENTION

The invention is founded upon the inventor's critical observation that arbitrary volumes in three dimensional color space can be formed to define a color by taking all of the pairwise combinations of the three color space channels to establish three compound color components whose intersection in color space can form a volume of arbitrary shape. This is illustrated in FIG. 3, where the three perpendicular axes 12, 14, and 16 of FIG. 1 are relabeled as, respectively, channel 1, channel 2, and channel 3 (ch1, ch2, and ch3, respectively) to represent three color element channels of a standard color video system. For example, these three channels could be the R-Y, B-Y, and Y channels of a color video system. The three channels are combined pairwise to form three arbitrary two-dimensional shapes 28, 30, and 32. Each of these shapes is represented on a color space plane defined by a respective pair of the intersecting axes. Thus, for example, the two-dimensional shape 28 is on a plane parallel to axes 12 and 16 and perpendicular to the axes 14. The three two-dimensional shapes are projected positively from the three axes, and the intersecting projections form the solid 40. It should be evident to those skilled in the art that any arbitrary combination of two sets of values on two channels can be designated as belonging to an identified color. Hereinafter, such an arbitrary combination of two values is referred to as a "compound color component" since it compounds arbitrary magnitude sets of a pair of color elements in three-dimensional color space.

The invention is based upon combining the three channels of FIG. 3 in all three possible pairwise combinations, and then combining the three pairwise combinations to identify colors in a defined set of colors in a video image composed of the three channels. Instead of designating the defined colors as the intersection of color space slabs, a color identified by this invention is the intersection of arbitrary areas on the faces of the color cube. Thus summarized, the invention makes possible the definition of colors occupying more complex volumes in color space than rectangular solids. In particular, the shapes in color space that real objects in a color video image assume when shadowed can be identified.

Therefore, it is an object of this invention to provide for identification of colors in a color video image based upon the combination of compound color components which are formed by pairwise combinations of mutually distinct color element magnitudes.

When the following detailed description is read with reference to the below-described drawings, it will become evident that the invention achieves this objective and provides other significant advantages and features.

DETAILED DESCRIPTION OF THE PREFERRED EMBODIMENTS

As used herein, "video color" or "color" refers to a unique combination of magnitude in all of three mutually distinct color elements or color channels. "Defined color" is taken as a region of color space occupied by some number of video colors or colors, all of which are considered to be equivalent for identification purposes. Last, a "zone" is a spatial zone within an image which is used to define an object of a certain size and color.

Figure 2:
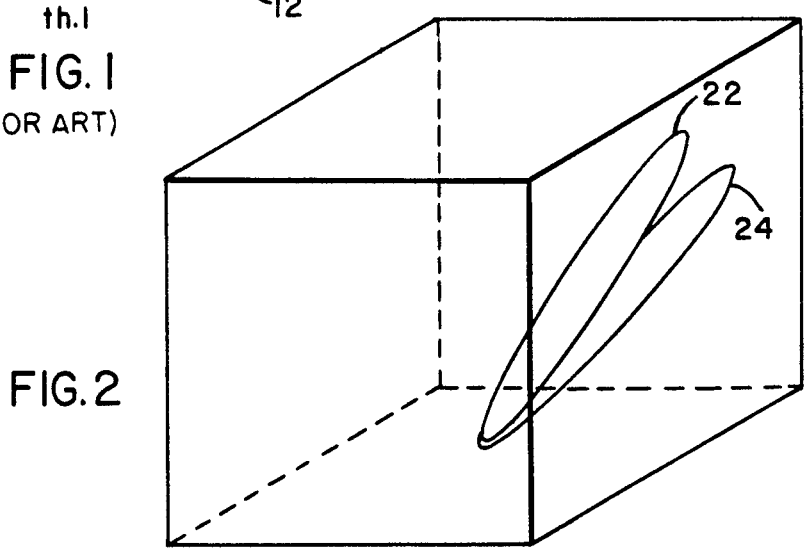
FIG. 2 illustrates a pair of ovoid solids in the cubic color space of FIG. 1 containing colors which cannot be discriminated by the concept of FIG. 1.
Figure 3:
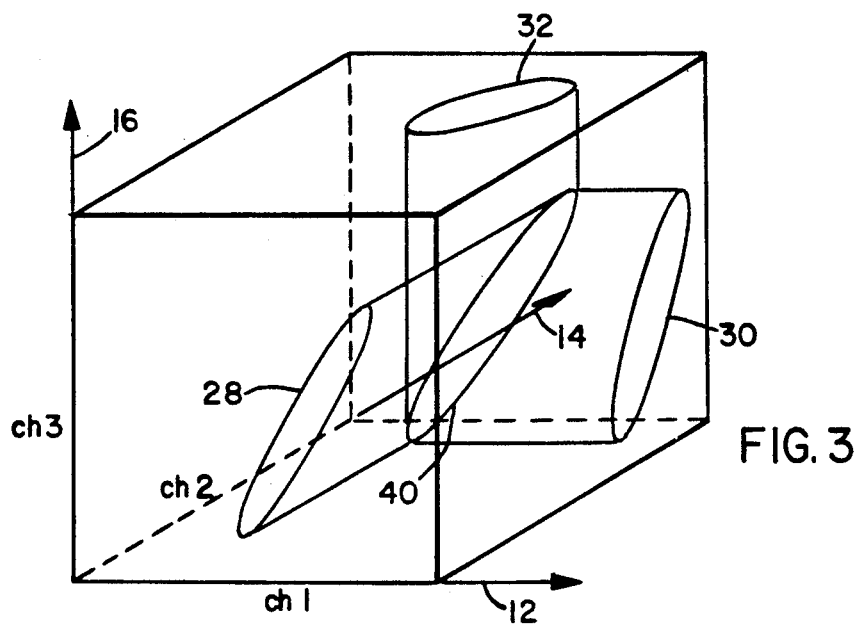
FIG. 3 illustrates how compound color components formed by pairwise combination of color channels are used in the invention to identify colors contained in non-rectangular color space solids.
Figure 4:
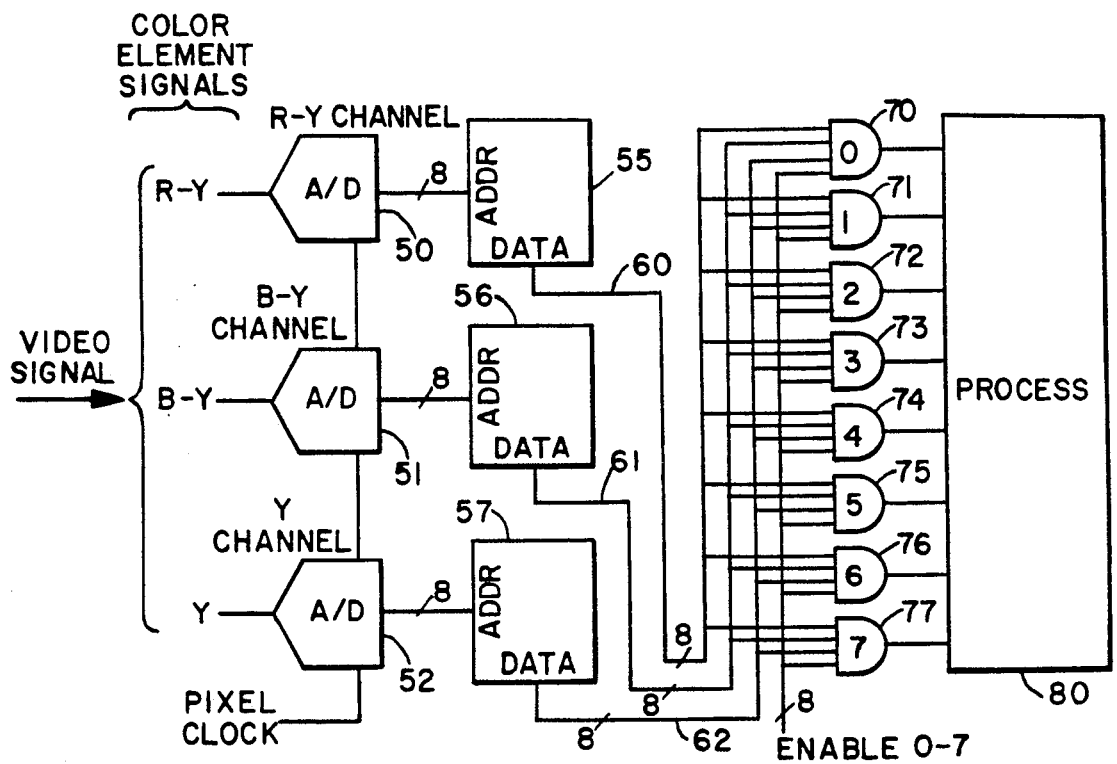
FIG. 4 illustrates the structure and interconnection of a color identification apparatus which operates according to the concept of FIG. 1.

The apparatus illustrated in FIG. 4 corresponds to the apparatus of the incorporated patent and implements the concept of color identification based upon the intersection of three orthogonally distinct color element ranges. This concept is discussed in the Background section of this application and illustrated in FIG. 1. In FIG. 4, color element signals R-Y, B-Y, and Y, also referred to as "color channels", are provided conditionally from means omitted from FIG. 4 but illustrated in FIG. 3 of the incorporated patent which render a composite color video signal into the component color element signals illustrated in FIG. 4. As is known, the R-Y, B-Y, and Y color element signals form the basis for a cartesian representation of cubic color space as per FIGS. 1, 2, and 3.

Each of the color element signals is provided to a respective one of three analogs to digital (A/D) converters 50, 51, and 52. The converters operate conventionally to convert the analog forms of the color element signals into multi-bit signals which change at the rate of a PIXEL CLOCK signal. The PIXEL CLOCK signal conventionally establishes the pixel rate of the video signal from which the color element signals are derived. Thus, the output of any of the converters 50, 51, and 52 is an 8-bit word whose value reflects the instantaneous magnitude of the color element signal being converted. The multi-bit signals provided by the converters 50, 51, and 52 are updated at the PIXEL CLOCK rate.

Completing the description of the structure of FIG. 4, each of the multi-bit words output by the converters 50, 51, and 52 is fed to the address (ADDR) port of a respective one of three memories 55, 56, and 57. The memories are conventional 256×8 arrays, each having a DATA port through which an 8-bit word stored at the currently-addressed memory location is provided. The three 8-bit words currently output by the memories 55, 56, and 57 are conducted on respective 8-bit signal paths 60, 61, and 62 to an array of eight AND gates 70-77. The outputs of the AND gates are fed in parallel to process circuitry 80.

Each of the AND gates 70-77 has four inputs, three fed by identically-located bits of the 8-bit words conducted on signal paths 60, 61, and 62. Thus, for example, AND gate 75 receives the sixth bit of each of the 8-bit words output by the memories 55, 56, and 57. Further, each of the AND gates receives a respective one of eight ENABLE signals. Therefore, if the third bit of each of the 8-bit words currently output by the memories 55-57 is set and the ENABLE$_2$ signal is activated, the output of the AND gate 72 will go high.

Figure 1:
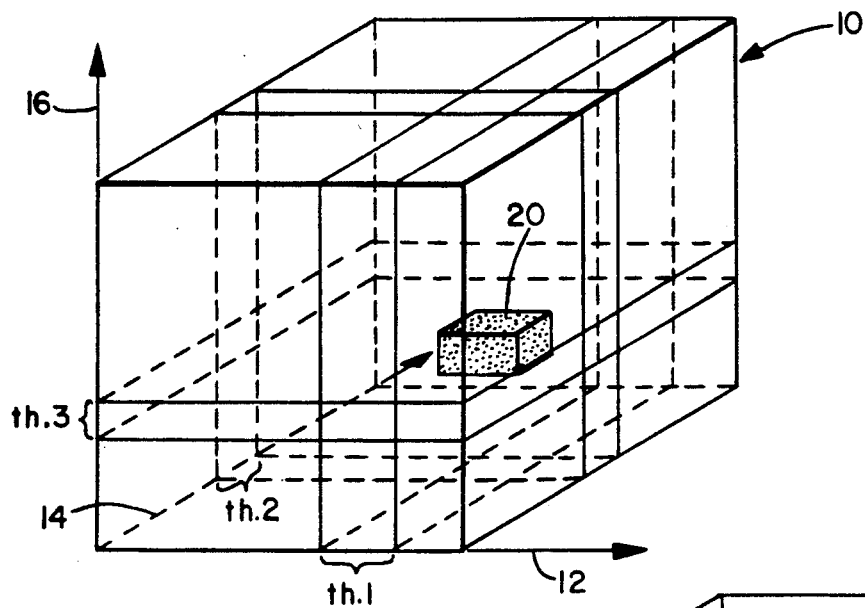
FIG. 1 illustrates the representation of color space as a cube and the identification of colors contained in that space by thresholds defined on three perpendicular edges of the cube.

The concept of FIG. 1 is implemented in FIG. 4 by the 8-bit words which are preloaded into memories 55-57. In this regard, the map of each of the memories 55-57 is a 256×8 array in which each of the eight stored bit columns corresponds to a predetermined color, while each of the 256 addressable locations at which the 8-bit words of a memory are stored corresponds to the instantaneous magnitude of the converted color element signal feeding the converter which addresses the memory. This permits each of the memories 55-57 to serve as a threshold range detector for one of the orthogonal axes of FIG. 1. For example, assume that the converters 50, 51, and 52 are associated, respectively, with the axes 12, 14, and 16 of FIG. 1. Then, the threshold range on the axis 12 denoted as th.1 in FIG. 1 would be given by a sequence of addresses in the memory 55. The range could be assigned to any one of eight colors, each of the colors associated with a respective one of the eight bits in the words stored in th.1 address range. In this regard, it is asserted that th.1 corresponds to a magnitude range of 210-220 for channel 1, which, when converted digitally, corresponds to the address spaces included in the address range beginning at 11010010 and ending at 11100001. This magnitude range could be assigned to any one of eight different defined colors by assigning a respective color to a particular bit position for the stored words. This is illustrated in Table I where bit position one of the stored word corresponds with color number 1 in a set of eight colors. As illustrated in Table I, channel 1 contributes a threshold to color 1 in the address locations corresponding to the magnitudes 213-220. Each of the other memories 56 and 57 is similarly programmed to establish threshold ranges establishing the contribution of the respective color element represented by the memory to each of the eight defined colors of a defined color set.

TABLE I

| ADDRESS | COLOR | | | | | | | |
|---|---|---|---|---|---|---|---|---|
| | 1 | 2 | 3 | 4 | 5 | 6 | 7 | 8 |
| 210 | 0 | 0 | 1 | 0 | 0 | 1 | 0 | 0 |
| 211 | 0 | 0 | 1 | 0 | 0 | 1 | 0 | 0 |
| 212 | 0 | 0 | 1 | 0 | 0 | 1 | 0 | 0 |

TABLE I-continued

| ADDRESS | COLOR | | | | | | | |
|---|---|---|---|---|---|---|---|---|
| | 1 | 2 | 3 | 4 | 5 | 6 | 7 | 8 |
| 213 | 1 | 0 | 1 | 0 | 0 | 1 | 0 | 0 |
| 214 | 1 | 0 | 1 | 0 | 0 | 1 | 0 | 0 |
| 215 | 1 | 0 | 1 | 0 | 0 | 1 | 0 | 0 |
| 216 | 1 | 0 | 1 | 0 | 0 | 1 | 0 | 0 |
| 217 | 1 | 0 | 0 | 0 | 0 | 1 | 0 | 0 |
| 218 | 1 | 0 | 0 | 0 | 0 | 1 | 0 | 0 |
| 219 | 1 | 0 | 0 | 0 | 0 | 1 | 0 | 0 |
| 220 | 1 | 0 | 0 | 0 | 0 | 1 | 0 | 0 |

Next, it is recalled that correspondingly-positioned bits of the memories 55, 56, and 57 connected to the same one of the eight AND gates 70-77. Therefore, for each PIXEL CLOCK cycle that the R-Y color element signal has a magnitude in the range corresponding to address locations 213-220, the bit in position 1 of the addressed word provided through the DATA port of the memory 55 will be set. If the identically-positioned bits in the 8-bit words output by the memories 56 and 57 are also set, and if the ENABLE 0 signal is activated, the output of the AND gate 70 will be activated.

Activation of the output of any one of the AND gates 70-77 indicates identification of the defined color corresponding to the bit position feeding the AND gate in the current pixel of the video signal.

Figure 5:
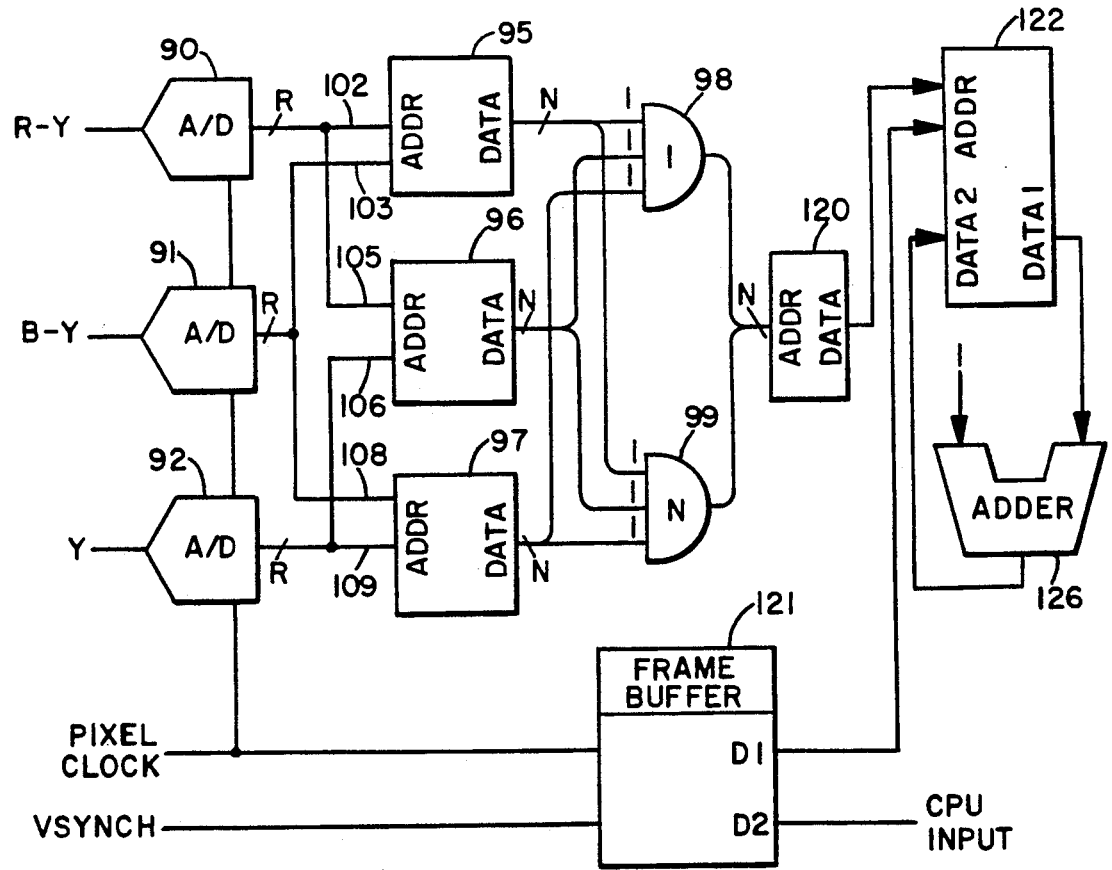
FIG. 5 illustrates the color identification apparatus of this invention.

Refer now to FIG. 5 for an understanding of how this invention improves the fundamental structure of FIG. 4. In FIG. 5, three converters 90-92 provide multi-bit signals at the PIXEL CLOCK rate in the manner described in connection with FIG. 4. The converters 90-92 are connected to provide address inputs to three memories 95-97. Each of the memories is an $R \times N$ array having address (ADDR) and DATA ports. Each array stores $2^{2R}$ words, each word comprising N bits. N AND gates, two indicated by 98 and 99, are connected, as described above to the three memories 95, 96, and 97. In this respect, each AND gate receives three bits, each bit provided by one of the three N-bit words currently provided by memories 95, 96, and 97; further the three bits occupy identical bit positions in the three words.

The improvement of the invention lies in the addressing and memory map layout of each of the memories 95, 96, and 97. As illustrated, the ADDR port of each of the memories 95-97 concatenates the two R-bit words output by a respective two of the three converters 90-92. Thus, the memory 95 concatenates, at its ADDR port, the two current R-bit words output by the converters 90 and 91. Similarly, the memories 96 and 97 concatenate the R-bit words output by the converters 90 and 92, and 91 and 92, respectively. Therefore, the address of each word in each of the memories combines the current magnitudes of two of the three color element signals obtained from the input video signal. This permits a 1-to-1 mapping of a two-dimensional color space area forming one of three compound color components of one of N defined colors into the map of each of the memories 95-97. The mapping is onto a bit position representing the particular defined color in the range of magnitudes of the two color elements embraced by the two-dimensional shape on the color cube face of FIG. 3 defined by the two color elements. Thus, a bit in the ith position of an N bit word output by one of the three memories indicates that the current magnitudes of the two color elements providing the address input for that memory are contained in the compound color component area for that color.

The outputs of the N AND gates in FIG. 5 indicate whether the current pixel of the video image has a color value contained in the one of the color space solids formed by intersecting projections of three compound color components.

Figures 6, 7:
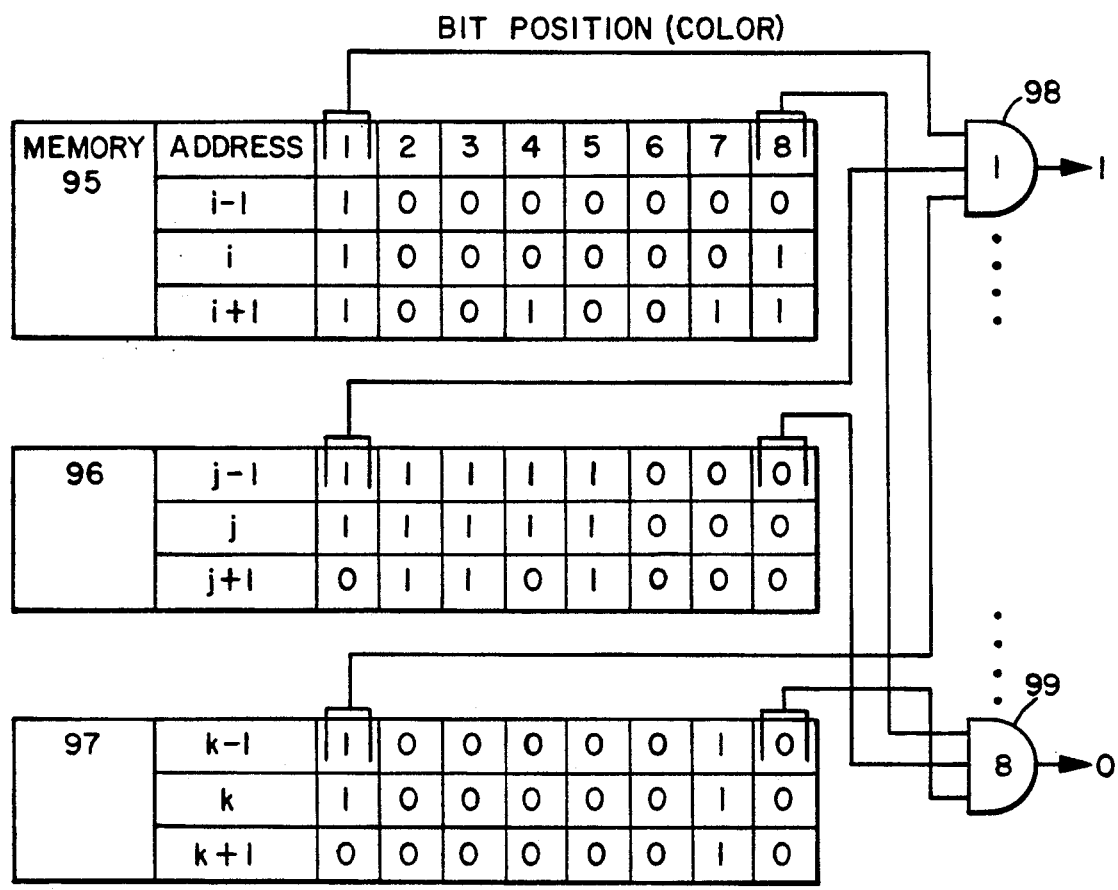
FIG. 6 illustrates a composite memory map for memory circuits in the apparatus illustrated in FIG. 5.
FIG. 7 illustrates a tabulation of colors identified in predetermined image zones of an image.

Representative memory maps and interconnections of the memories 95-97 and AND gates 98 and 99 are represented in FIG. 6. FIG. 6 illustrates how the memories 95, 96, and 97 are mapped, and how the compound color component words in those memories activate the AND gates 98 and 99 to provide identification of color. In FIG. 6, a portion of the map of 95 extending from address $(i-1)$ through $(i+1)$ is shown. Similarly, the portion of the compound color component words stored in memory 96 from address location $(j-1)$ through $(j+1)$ and the component words stored in memory 97 from $(k-1)$ through $(k+1)$ are shown. The compound color component words are 8-bit words, indicating that eight colors are defined. Therefore, eight AND gates are required, with the gate 98 being denoted as the identification gate for defined color 1 and the gate 99 being the identification gate for defined color 8. Assume now that the converted color element magnitudes produced by the converters 90 and 91 provided to the memory 95 on signal lines 102 and 103 (FIG. 5) concatenate to i, that the color element magnitudes on signal lines 105 and 106 of FIG. 5 concatenate to j, while the color element magnitudes on signal lines 108 and 109 of FIG. 5 concatenate to a value k. In this case, the of bits in bit position 1 of the ith, jth, and kth compound color component words in memories 95, 96, and 97, respectively, are conducted to the inputs of AND gate 98, indicating that the defined color identified by bit position 1 of the compound color component words is present in the current pixel. In this case, since the AND gate 98 is conventional, its output will activate to indicate identification of the defined color.

Further describing the structure and operation of FIG. 5, the components 90-92, 95-97, and 98-99 all operate at the PIXEL CLOCK rate. Relatedly, the outputs of the N AND gates provide an N-bit color identification word once each PIXEL CLOCK cycle. It should be evident that a succession of identically-colored pixels will produce a succession of identical N-bit words from the AND gates. Pixel color change resulting in a change in defined color from one pixel to the next will be indicated by non-equality of adjacent color identification words.

Processing of the color identification words produced by the AND gates is done in circuitry consisting of a conventional programmable memory 120, a programmable dual-ported frame buffer 121, a programmable high-speed dual ported memory 122, and an adder 126.

The memory 120 is conventional and may be a dual ported device with one port (not shown) dedicated to programming, and the other (ADDR/DATA) to output of programmed information. The ADDR port of the memory 120 receives the N bit color identification word output by the AND gates. The purpose of this memory is to serve as a priority encoder to resolve cases in which a single video color is defined as belonging to more than one defined color. If it is conceded that the set of colors defined in the memories 95-87 can overlap, there are $2^N$ possible color identification words which the AND gates can produce. These range from 0, indicating that the color of the current pixel is none of the defined colors, to $2^N-1$, indicating that the current pixel's color is within all of the defined colors. The memory 120 is used, preferably, to resolve ambiguities wherein the color identification word indicates more than one identified color. Assuming that N=8, ambiguity resolution can be accomplished by programming the memory 120 as indicated in Table II.

TABLE II

| ADDRESS LOCATION | DIGITAL VALVE |
|---|---|
| 1 | 0 |
| 2 | 1 |
| 4 | 2 |
| 8 | 3 |
| 16 | 4 |
| 32 | 5 |
| 64 | 6 |
| 128 | 7 |
| All Others | 8 |

Thus, the digital values 0–7 output from the DATA port of the memory 120 indicate that the current pixel non-ambiguously possesses one of the defined colors 1–8. The number 8 provided through the DATA port of the memory 120 indicates no defined color, or an ambiguous combination of two or more defined colors. It will be evident that more complex transforms can be programmed into the memory 120. For example, if the designer desired to separately count pixels whose colors are members of defined colors 1, 2, and 3, the location whose memory 120 binary address is 00000111 could be loaded with a 9.

A standard dual port frame buffer 121 is provided, which operates in response to the PIXEL CLOCK signal and to the vertical synchronization signal (VSYNCH) provided by the system which produces the video signal rendered into the color element signals. The buffer 121 is dual ported in that it has a data port (D1) from which stored frame buffer information is provided at a video rate (synchronized to the PIXEL CLOCK signal), and an address send data port (D2) through which frame buffer information can be input from a CPU (not shown). In the circuit illustrated in FIG. 5, the frame buffer 121 stores zone codes, the number of zones corresponding to the depth of the buffer. If the buffer is 8 bits deep, there are 256 possible zones which can be defined for a standard video frame. Each pixel which is a member of a given zone is so flagged by writing the zone number into the frame buffer location for that pixel. The frame buffer 121 outputs through its video port (D1) the zone number of each pixel while that pixel is being received by way of the color elements the synchronization between the converters 90-92 and the frame buffer output 121 being provided by the PIXEL CLOCK and the SYNCH signals which also drive the source of the video signal. The zone information for the current pixel output through the video port D1 is available, together with the word output by the memory 120 at the address (ADDR) port of a dual-ported, read-modify-write, video rate memory 122. The read-modify-write operation of the memory 122 must be completed in one cycle of PIXEL CLOCK. Therefore, the memory operates at a rate at least thrice the PIXEL CLOCK rate.

The memory 122 and adder 126, together, form a video rate counter, which creates the array illustrated in FIG. 7. FIG. 7 illustrates an array in the form of a Table created by operation of the memory 122 and adder 126 in processing one frame of video information. In one video frame, the counter counts, for each zone, the number of pixels in the zone which have a video color within each color of the defined set. Thus, for example, in one frame, the number of pixels in zone 1 having the color identified as 1 in the defined color set is 100 (decimal). Returning to FIG. 5, the Table is created by initializing the memory 122 to all zeros, and then combining the pixel zone designation output by the frame buffer 121 and the color identification code output by the memory 120 to the address port of the memory 122. Initially, the value at the current address will be 0, which will be output through the DATA 1 port of the memory 122 to one input of the adder 126, and incremented by one by the adder 126 to form a sum which is re-entered to the same location through the DATA 2 port of the memory 122. (The "1" input to the left hand port of the adder 126 increments the value input to the right hand port by one.) Thereafter, each time this location is addressed, its contents will be incremented by one in the read-increment-write process just described The application of the system of FIG. 5 is manifold. For example, in a robot system which inspects an assembly line of colored objects, the inspection system can be taught to recognize important objects by assigning a defined color characteristic to each object. Next, zones are defined specifying where each important object should be in a video image frame. Then, the system is provided with an ideal arrangement of parts in the form of a stored frame of video in which the parts appear as objects, and the system is taught the correct range of counts that should be found in the Table of FIG. 7 for an acceptable assembly of objects. During run time inspection, the system camera views the assemblies as they pass a monitoring point, and the apparatus of FIG. 5 generates an example of the Table illustrated in FIG. 7 for each assembly viewed. This table is compared to the stored acceptance range Table based upon the ideal assembly, and the assembly currently inspected is accepted or rejected, according to how much it deviates from the correct values of the ideal assembly.

Although the invention for which patent protection is sought has been described in the context of a preferred embodiment, those skilled in the art will appreciate that variations, modifications, and elaborations can be made to the above teachings. For example, the multi-bit words produced by the converters 90-92 can be any width, and need not be equal. These are selected to match or exceed the precision of the video camera providing the R-Y, B-Y, and Y signals. The widths of the compound color component words stored and provided by the memories 95-97 must be equal (to N) and are chosen according to the number of objects which a system is to recognize. N-bit words means that an identification system would recognize N types of defined colors, plus a background color and any other combination colors desired. The color identification word produced by the AND gates must also equal N, the width of the compound color component word stored in the memories 95-97. The information stored in the memory 120 must be provided by a word having enough bits to encode the number of types of objects which a system must recognize, plus background. Generally, the width of the address of the memory 120 (A) must be chosen such that N is less than or equal to 2A. The frame buffer words can be any width sufficient to define the number of spatial regions to be examined in one video field. The width of the words stored in the memory 122 must equal the sum of the width of the words stored in the frame buffer 121 and the memory 120. Preferably, the width of the words in the memory 122 is enough that the number of pixels in the largest object expected will not cause an overflow.

While I have described several preferred embodiments of my invention, it should be understood that further modifications and adapatations thereof will occur to persons skilled in the art. Therefore, the protection afforded my invention should only be limited in accordance with the scope of the following claims.

I claim:

1. In a system for detecting the presence of colored features in a colored video image by detecting in a video image signal representing said colored video image a color in a predetermined set of defined colors, said system including means for rendering said video image signal into a set of color element signals corresponding to a set of mutually distinct color elements, each color in said set of defined colors being composed of a set of compound color components, each of said compound color components being composed of a combination of a respective two of said color elements, an improved apparatus for identifying a color in said set of defined colors, said improved apparatus comprising, in combination:

a set of converters, each of said converters for converting a respective one of said color element signals into a time-varying, multi-bit signal representing the magnitude of a respective one of said color elements;

a set of M memories, each of said M memories having a set of sequentially addressed storage locations, an address port for receiving a storage location address, and a data port for providing a signal stored at an addressed storage location;

the address port of each of said M memories connected to a respective two converters of said set of converters to receive two multi-bit signals;

said each of said M memories including an N-bit presence signal stored in a storage location of said each of said M memories, said storage location having an address corresponding to one of said compound color components including the color element magnitudes represented by the two multi-bit signals received at the address port of said each of said M memories, each bit position of said N-bit presence signal corresponding to a respective color in said set of defined colors; and N gate circuits, each of said N gate circuits having M inputs and one output, each of said M inputs connected to a respective memory data port, said M inputs receiving signals from identical bit positions of said N-bit presence signals stored in said M memories, said each of said gate circuits producing an identification signal indicating the presence of a first defined color of said set of defined colors in response to the M input signals received by said each of said gate circuits.

2. The improved apparatus of claim 1, wherein said identification signals produced by said N gate circuits from a color identification word identifying said first defined color, said improved apparatus further including a color occurrence accumulator connected to said N gate circuits for accumulating a count of occurrences of said first defined color in said colored video image in response to said color identification word.

3. The improved apparatus of claim 2 wherein said color occurrence accumulator includes:

a frame buffer containing a map of said colored video image, said map including an array of image zones, said frame buffer providing an image zone location signal indicating an image zone of said map;

an accumulating memory connected to said N gate circuits and to said frame buffer for storing said count at a storage location corresponding to said image zone and said first defined color; and incrementing means connected to said accumulations memory for incrementing said count each time said first defined color is present in said image zone.

4. The improved apparatus of claim 2 further including a color discriminator connected to the outputs of said N gate circuits and to said color occurrence accumulator for producing said color identification word in response to N said identification signals produced by said N gate circuits.

5. The improved apparatus of claim 4 wherein a first identification signal of said N identification signals indicates the presence of said first defined color.

6. The improved apparatus of claim 5 wherein a second identification signal of said N identification signals indicates the presence of a second defined color in said set of defined colors.

7. A color detecting apparatus for operating in response to a color video image signal which includes a sequence of pixels, each of said pixels corresponding to a color, said color being represented by three mutually distinct color elements, said apparatus comprising:

three converters, each of said converters receiving a pixel of said sequence and producing in response to said pixel a color element signal representing a magnitude of one respective color element of said three mutually distinct color elements;

three compound color component means, each of said compound color component means connected to a respective two of said three converters for converting a respective two of the three color element signals produced by said three converters into a compound color component signal, said compound color component signal representing a respective compound color component of a first color in a set of defined colors; and combining means connected to said three compound color component means for combining the three compound color component signals produced by said three compound color component means to produce a color identification signal which represents said first color.

8. The apparatus of claim 7, further including a color occurrence accumulator connected to said combining means for accumulating a count of first color occurrences in said color video image signal in response to said color identification signals produced by said combining means and to a video image corresponding to said color video image signal.

9. The apparatus of claim 8, wherein said color occurrence accumulator includes:

a frame buffer containing a map of a colored video image represented by said color video image signal, said map including an array of image zones, said frame buffer providing an image zone location signal indicating an image zone of said map;

an accumulating memory connected to said combining means and to said frame buffer for storing said count at a storage location corresponding to said image zone and said first color; and incrementing means connected to said accumulating memory for incrementing said count each time said first color is present in said image zone.

10. The apparatus of claim 8, wherein said color identification signal further identifies a second color in said set of defined colors, said apparatus further including a color discriminator connected to said combining means and to said color occurrence accumulator for conditioning said color identification signal to represent only said first color.

11. The apparatus of claim 8, wherein said color identification signal identifies a color not in said set of defined colors, said apparatus further including a color discriminator connected to said combining means and to said color occurrence accumulator for conditioning said color identification signal to represent no color.

12. In a system for identifying one color of a set of defined colors occurring in a scanned video image wherein a time-varying color video image signal representing said scanned video image is rendered into a plurality of time-varying color component signals, each of said color component signals representing one color component of a plurality of mutually distinct color components, an improvement for identifying image colors, said improvement comprising:

a plurality of combining means, each of said combining means for combining two of said color component signals;

signal means in each of said combining means, responsive to a combination of two of said color component signals, for producing a presence signal indicating that said combination of two of said color component signals produces a compound color component of a color in said set of defined colors; and an identification circuit connected to said plurality of combining means for producing a color identification signal indicative of the presence of said color in said scanned video image in response to said presence signals produced by said signal means.

* * * * *